(12) United States Patent
Matsuyama et al.

(10) Patent No.: US 7,320,464 B2
(45) Date of Patent: Jan. 22, 2008

(54) ORIGINAL READING DEVICE WITH CONTROLLER

(75) Inventors: Kengo Matsuyama, Osaka (JP); Kenji Tanaka, Uji (JP); Yoshiyuki Nishizato, Nara (JP); Yasumasa Morimoto, Kashihara (JP); Masato Tamehira, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 516 days.

(21) Appl. No.: 10/890,517

(22) Filed: Jul. 14, 2004

(65) Prior Publication Data

US 2005/0012969 A1     Jan. 20, 2005

(30) Foreign Application Priority Data

Jul. 15, 2003   (JP)   ............... P2003-274727

(51) Int. Cl.
*B65H 3/06*    (2006.01)
(52) U.S. Cl. ............ 271/114; 271/258.03; 271/258.01; 271/270; 271/266; 271/265.01
(58) Field of Classification Search ........... 271/258.03, 271/258.01, 270, 266, 265.01, 114, 116
See application file for complete search history.

(56) References Cited

U.S. PATENT DOCUMENTS

| | | | |
|---|---|---|---|
| 4,350,436 A * | 9/1982 | Yagasaki et al. ........ 271/258.01 |
| 4,790,524 A * | 12/1988 | Murakami et al. ......... 271/9.09 |
| 5,118,091 A * | 6/1992 | Nagamoto et al. .......... 271/122 |
| 5,528,352 A * | 6/1996 | Ichinokawa et al. ........ 399/365 |
| 6,038,424 A * | 3/2000 | Nakagawa ................... 399/367 |
| 6,131,898 A * | 10/2000 | Hiroi et al. .............. 271/10.03 |
| 6,213,458 B1 * | 4/2001 | Tamura et al. ........... 271/10.11 |
| 6,333,797 B1 * | 12/2001 | Katsuta et al. .............. 358/498 |
| 6,533,263 B2 * | 3/2003 | Tamura ................... 271/10.01 |
| 6,554,216 B1 * | 4/2003 | Escobedo et al. ........... 242/270 |
| 6,651,980 B2 * | 11/2003 | Isemura et al. ............. 271/259 |

FOREIGN PATENT DOCUMENTS

| | | |
|---|---|---|
| JP | 4-7237 A | 1/1992 |
| JP | 11-59955 A | 3/1999 |
| JP | 2001-146337 A | 5/2001 |

* cited by examiner

*Primary Examiner*—Patrick Mackey
*Assistant Examiner*—Gerald W McClain
(74) *Attorney, Agent, or Firm*—Nixon & Vanderhye, PC (57) ABSTRACT

An original reading device includes a registration roller located upstream of an original reading position in an original transport path for adjusting the timing of feeding an original to the original reading position. There is at least one original feed roller for transporting the original which has been fed from an original loading tray into the original transport path toward the registration roller. A rotary motion controller is also provided, and it causes the original feed roller closest to the registration roller to rotate when a rear part of the original close to a trailing edge thereof passes over the original feed roller closest to the registration roller.

6 Claims, 6 Drawing Sheets

ORIGINAL READING DEVICE WITH CONTROLLER

CROSS REFERENCE

This Nonprovisional application claims priority under 35 U.S.C. § 119(a) on Patent Application No. 2003-274727 filed in Japan on Jul. 15, 2003, the entire contents of which are hereby incorporated by reference.

BACKGROUND OF THE INVENTION

The present invention relates to an original reading device for reading image information on an original. More particularly, the invention pertains to a original reading device having an automatic document feeding function.

One known method of reading an original used in an original reading device is an original moving method in which image information on the original is read as the original is fed through an original transport path. The original moving method, widely used in the original reading device in recent years, has an advantage that a plurality of originals loaded on a document tray can be automatically transported to an original reading position and read one after another.

The original moving method, however, has a problem that if unevenness in original transport speed occurs at the original reading position, this unevenness in the original transport speed results in irregularities in a read image. It is therefore important for the original reading device employing the original moving method to ensure that the original transport speed does not become uneven at the original reading position.

One example of a prior art arrangement for the solution of this problem is shown in Japanese Laid-open Patent Application No. H04-7237. A document feeder described in this Patent Application includes a transport roller located tight against an original reading portion with an original transport path formed between the original reading portion and the transport roller. The transport roller feeds an original downstream along the original transport path while pressing the original against the original reading portion at the original reading position.

The document feeder of Japanese Laid-open Patent Application No. H04-7237 includes a pair of rotary motion transmission mechanisms provided at both axial ends of the transport roller, each rotary motion transmission mechanism including an untoothed pulley and an untoothed belt. Since the untoothed belt of each rotary motion transmission mechanism properly slips over the untoothed pulley, the rotary motion transmission mechanisms located at both axial ends of the transport roller are not likely to produce a phase lag. For this reason, it is generally appreciated that the document feeder of this Patent Application is unlikely to produce unevenness in original transport speed.

However, the aforementioned arrangement of the document feeder of Japanese Laid-open Patent Application No. H04-7237 does not take into consideration unevenness in the original transport speed occurring at the original reading position due to a relation between the transport roller and an original feed roller. A main factor that causes this unevenness in the original transport speed is a load fluctuation which occurs when a trailing edge of the original passes beyond the original feed roller.

Since this load fluctuation is not taken into consideration in the design of conventional document feeders, there is a risk of degradation of original reading accuracy due to the unevenness in the original transport speed at the original reading position.

SUMMARY OF THE INVENTION

It is an object of the invention to provide an original reading device which can reduce the risk of the occurrence of unevenness in original transport speed at an original reading position with a simple construction.

To achieve this object, an original reading device of the invention includes an original transport path, a registration roller, an original feed roller and a rotary motion controller.

Unevenness in original transport speed is likely to occur if a load fluctuation occurs when a trailing edge of an original being transported along the original transport path passes beyond the original feed roller. The load fluctuation is apt to occur when a rear part of the original close to the trailing edge thereof secured by the original feed roller is released. This load fluctuation is most likely to occur if a tensile force is exerted on the original when the rear part of the original is released.

In the original reading device of the invention, the rotary motion controller causes the original feed roller to rotate when the rear part of the original passes over the original feed roller. When the original feed roller rotates in this way, the rear part of the original is pushed downstream in an original feeding direction. Consequently, the tensile force exerted on the original relieved. If the circumferential speed of the original feed roller is higher than the circumferential speed of the registration roller, the original properly slacks before the rear part of the original passes beyond the original feed roller. If the original properly slacks in this way, the original becomes less susceptible to the load fluctuation when the rear part of the original is released and, as a consequence, the unevenness in the original transport speed becomes less likely to occur.

These and other objects, features and advantages of the invention will become more apparent upon reading the following detailed description along with the accompanying drawings.

DETAILED DESCRIPTION OF THE INVENTION

An original reading device 1 having an automatic document feeding function according to a specific embodiment of the invention is now described with reference to the accompanying drawings.

Figure 1:
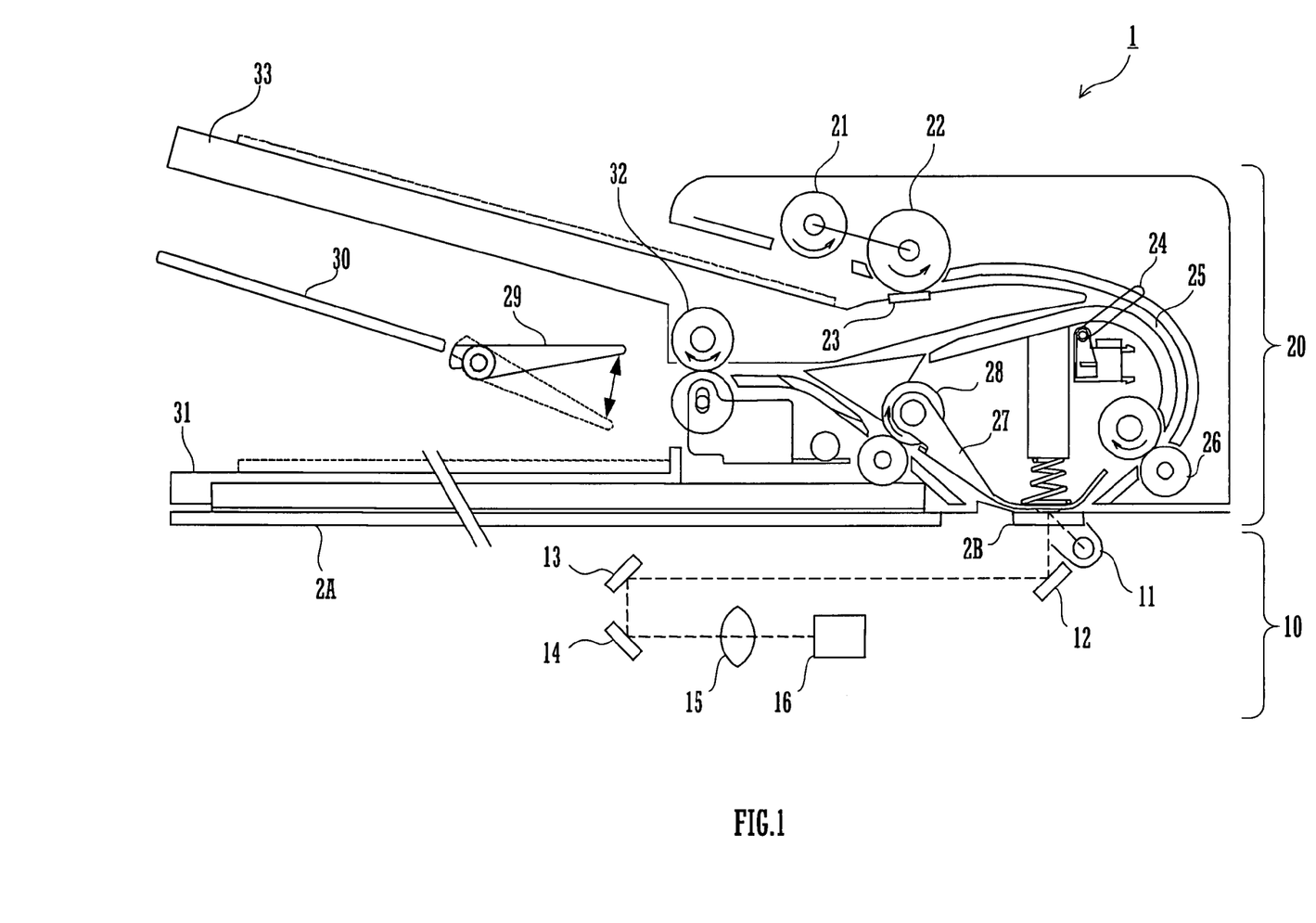
FIG. 1 is a diagram showing the construction of an original reading device according to a preferred embodiment of the invention.

FIG. 1 is a diagram showing the construction of the original reading device 1 according to the embodiment of the invention. The original reading device 1 includes platen glass plates 2A and 2B. The original reading device 1 is roughly divided into two sections. These are an automatic document feeder 20 located above the platen glass plates 2A, 2B and an optical scanning system 10 located beneath the platen glass plates 2A, 2B.

The optical scanning system 10 includes a light source 11, mirrors 12, 13, 14, an optical lens 15 and a charge-coupled device (CCD) 16. The light source 11 projects light on an original and the mirrors 12, 13, 14 guide the light reflected by the original to the optical lens 15 which focuses the reflected light on the CCD 16. The CCD 16 is a photoelectric converting device which converts incident light into an electric signal.

The automatic document feeder 20 itself serves as an original cover for covering and uncovering the platen glass plates 2A, 2B. The automatic document feeder 20 includes an original loading tray 33 on which originals are loaded and an original output tray 31 on which each original which has undergone an image reading process is discharged from an original transport path 25.

The original transport path 25 is formed between the original loading tray 33 and the original output tray 31 by way of an original reading position. The automatic document feeder 20 further includes a pickup roller 21, a separation roller 22, a pair of registration rollers 26, a pair of transport rollers 28 and a pair of discharge rollers 32. These rollers are disposed along the original transport path 25 from upstream side to downstream side thereof as illustrated in FIG. 1. In this embodiment, the original reading position is situated in that part of the original transport path 25 which faces the platen glass plate 2B.

There is provided a separation plate 23 disposed face to face with the separation roller 22 on an opposite side of the original transport path 25. There is provided a transported original sensor 24 for detecting each original being transported between the separation roller 22 and the registration rollers 26 along the original transport path 25. On an opposite side of the platen glass plate 2B with respect to the original transport path 25, there is also provided an original holder 27 for pressing the original which is undergoing the image reading process against the platen glass plate 2B.

The discharge rollers 32 are located at a downstream end of the original transport path 25 as shown in FIG. 1. Close to the discharge rollers 32, there is provided a flapper 29 for selectively guiding the original being ejected through the discharge rollers 32 onto an intermediate tray 30 or onto the original output tray 31.

Figure 2:
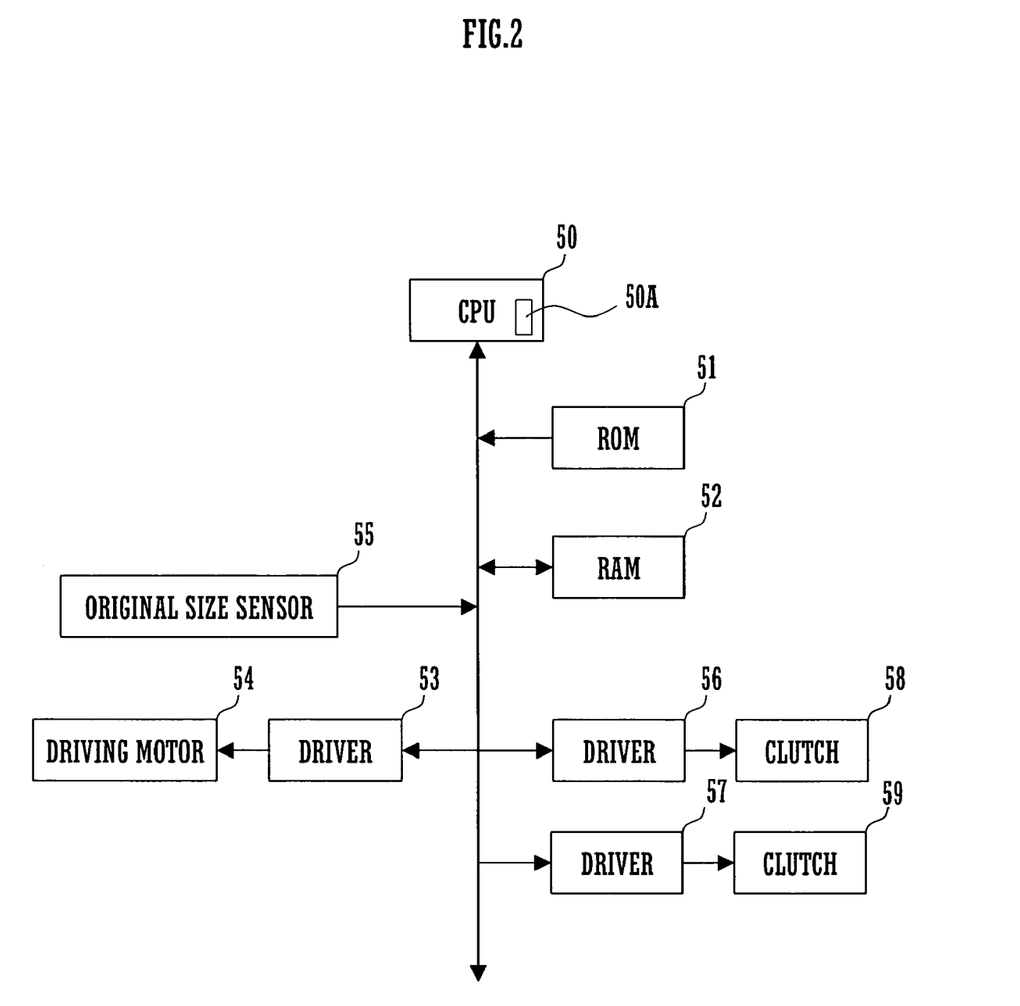
FIG. 2 is a block diagram showing the configuration of principal parts of the original reading device of FIG. 1.

FIG. 2 is a block diagram showing the configuration of principal parts of the original reading device 1. As shown in FIG. 2, the original reading device 1 includes a central processing unit (CPU) 50, a read-only memory (ROM) 51, a random-access memory (RAM) 52, an original size sensor 55, a driving motor 54, clutches 58 and 59, a driver 53, and drivers 56 and 57.

The ROM 51 stores a program necessary for operating the original reading device 1 according to a prescribed operating sequence. The RAM 52 is a volatile memory used for temporary data storage. The original size sensor 55 is disposed on the original loading tray 33 for detecting the size of the original. The driving motor 54 works as a prime mover which produces and transmits a rotational driving force to the separation roller 22 and the registration rollers 26.

In this embodiment, the separation roller 22 serves as an original feed roller for feeding each original into the original transport path 25. It is to be noted, however, that the original feed roller is not necessarily limited to the separation roller 22 according to the invention. If there is provided another roller (or roller pair) for feeding each original between the separation roller 22 and the registration rollers 26, for example, this roller (roller pair) disposed along the original transport path 25 upstream of the registration rollers 26 is also an original feed roller (roller pair).

The clutch 58 is disposed on a driving force transmitting route through which the driving force of the driving motor 54 is transmitted to the separation roller 22. The clutch 59 is disposed on a driving force transmitting route through which the driving force of the driving motor 54 is transmitted to the registration rollers 26. The driver 53 drives the driving motor 54 according to an instruction fed from the CPU 50. The driver 56 engages and disengages the clutch 58 according to an instruction fed from the CPU 50. The driver 57 engages and disengages the clutch 59 according to an instruction fed from the CPU 50.

Working in accordance with the program stored in the ROM 51, the CPU 50 controls the individual parts of the original reading device 1 in a centralized fashion. Specifically, the CPU 50 outputs specific signals to the drivers 53, 56, 57 to cause the drivers 53, 56, 57 to operate. More specifically, the CPU 50 controls the operation of the driving motor 54, the original feed roller and the registration rollers 26 through the drivers 53, 56, 57. In this embodiment, the CPU 50 constitutes a rotary motion controller of the invention.

The CPU 50 includes an internal timer 50A for counting time. Using this timer 50A, the CPU 50 measured time elapsed from the beginning of a specific action.

Figure 3:
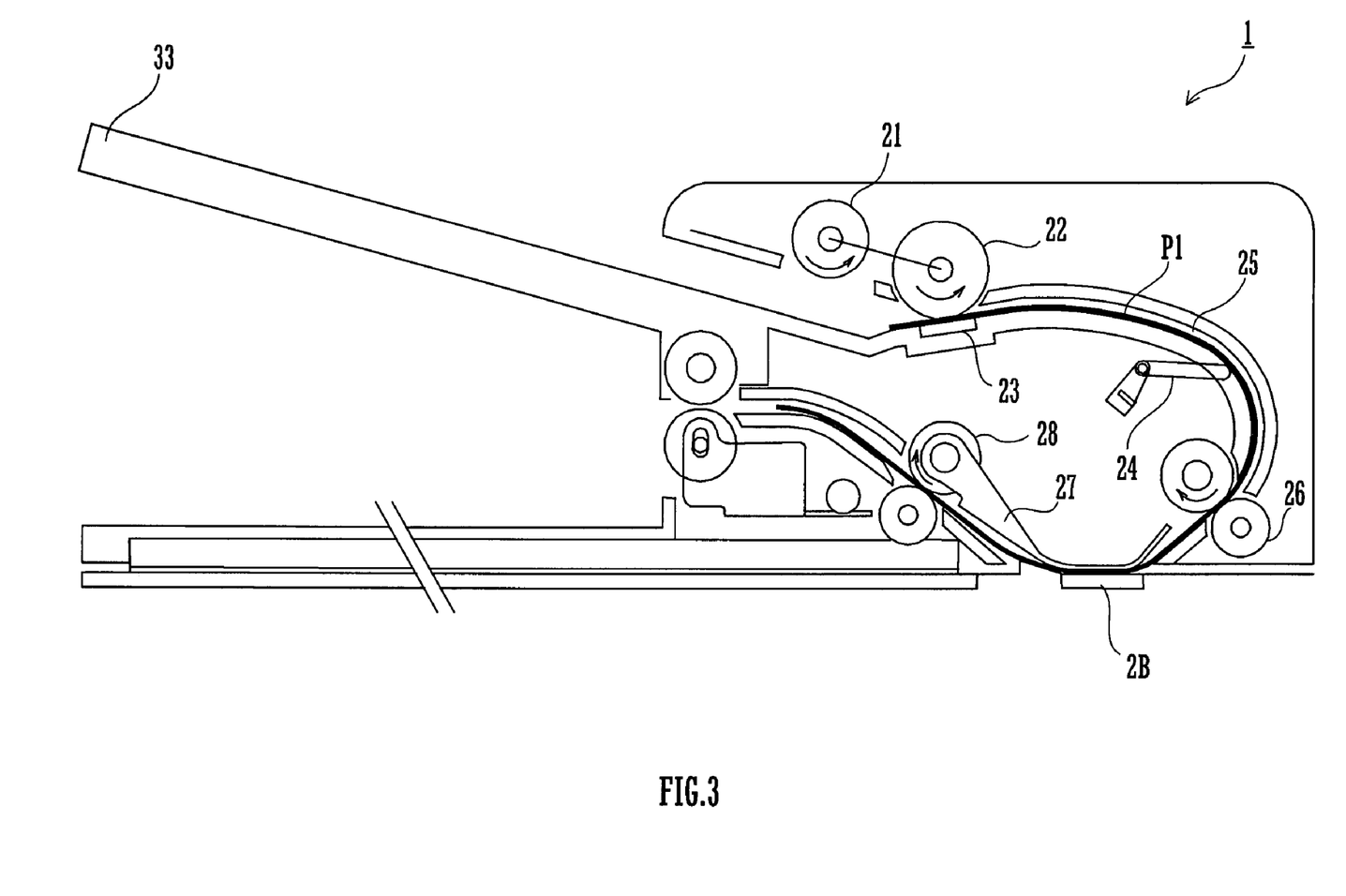
FIG. 3 is a diagram showing how an original is transported in the original reading device.

FIG. 3 is a diagram showing how each original is transported in the original reading device 1. Each sheet of originals stacked on the original loading tray 33 is pulled out from the original loading tray 33 by the pickup roller 21. Even if the pickup roller 21 pulls out more than one sheet from the original loading tray 33, only a single original P1 is fed into the original transport path 25 at a time as the separation roller 22 and the separation plate 23 located downstream of the pickup roller 21 prevent more than one sheet from being fed at a time.

As the original P1 is transported along the original transport path 25 in an original feeding direction, the transported original sensor 24 detects a leading edge and a trailing edge of the original P1. Rotary motion of the separation roller 22 stops after the leading edge of the original P1 transported downstream in the original feeding direction has come into contact with the registration rollers 26. This means that the original P1 is once stopped before the original P1 is advanced to the original reading position. More specifically, the CPU 50 causes the separation roller 22 to stop a specific period of time after the transported original sensor 24 has detected the leading edge of the original P1.

The original P1 is kept in a standby state with the leading edge of the original P1 held in contact with the registration rollers 26 in this fashion and the registration rollers 26 are caused to rotate with specific timing to adjust the timing of guiding the original P1 to the original reading position. When the timing of guiding the original P1 to the original reading position is reached, the CPU 50 causes the registration rollers 26 to rotate so that the original P1 is advanced to the original reading position. The moment the CPU 50 causes the registration rollers 26 to rotate, the CPU 50 causes the internal timer 50A thereof to start counting the time. The original P1 passes over the original reading position while being pressed by the original holder 27 against the platen glass plate 2B. The optical scanning system 10 reads image information on the original P1 while the original P1 passes over the original reading position.

When the registration rollers 26 begin to advance the original P1 sandwiched therebetween, the clutch 58 is in a disengaged state, so that the rotational driving force of the driving motor 54 is not transmitted to the separation roller 22.

Figure 4:
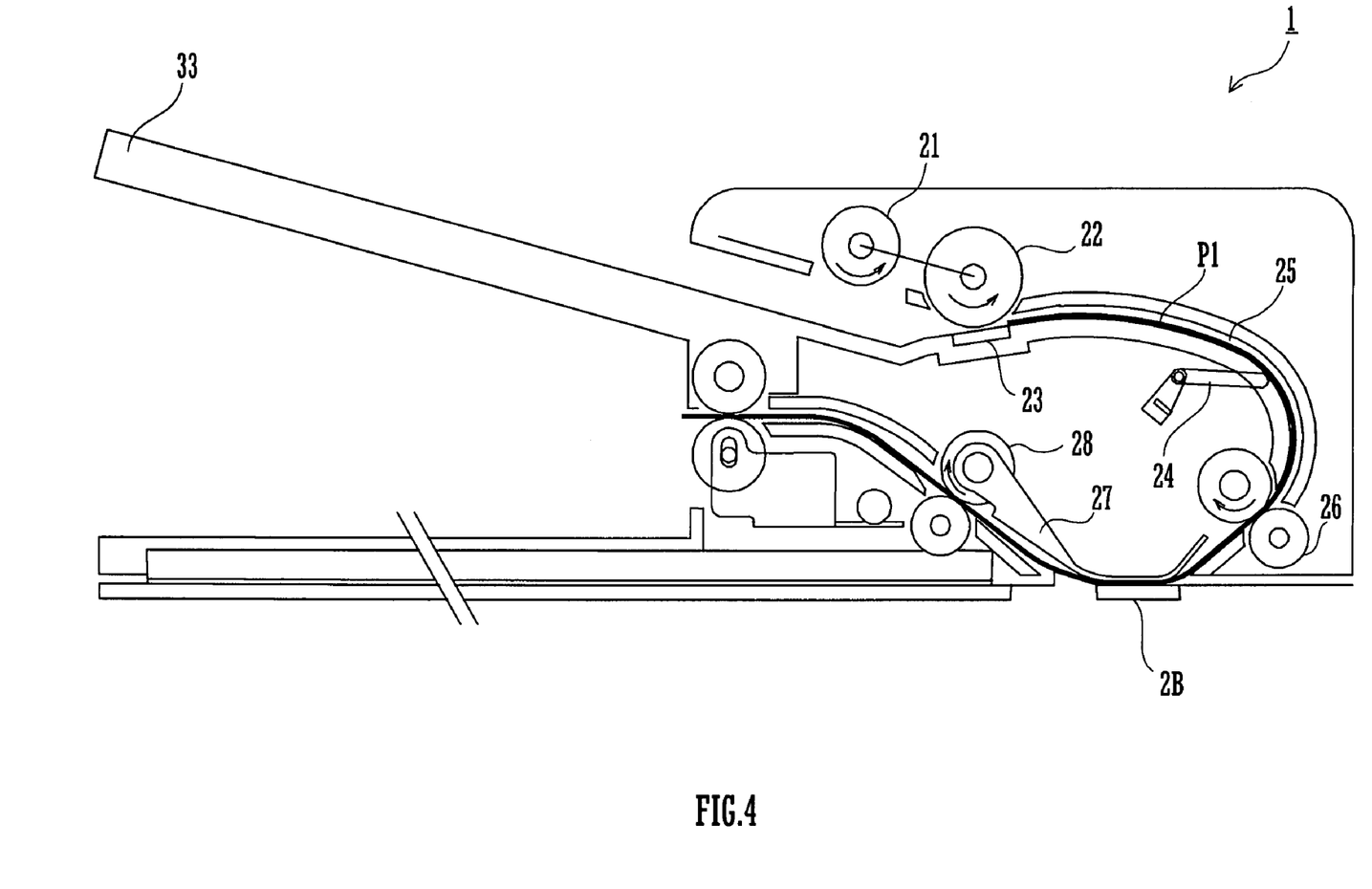
FIG. 4 is a diagram showing how the original is transported in the original reading device.

FIG. 4 is a diagram showing a situation in which the trailing edge of the original P1 has just passed a point between the separation roller 22 and the separation plate 23. Until the trailing edge of the original P1 passes between the separation roller 22 and the separation plate 23, a tensile force occurs in the original P1. This tensile force occurs as a forward part (close to the leading edge) of the original P1 is pulled downstream in the original feeding direction by the registration rollers 26 while a rear part of the original P1 close to the trailing edge thereof is gripped between the separation roller 22 and the separation plate 23.

When the trailing edge of the original P1 passes between the separation roller 22 and the separation plate 23, the rear part of the original P1 gripped between the separation roller 22 and the separation plate 23 is released. In the earlier-mentioned original reading device (document feeder), a load fluctuation occurs when the rear part of the original is released and, as a consequence, unevenness occurs in the original transport speed as the original passes over the original reading position. This unevenness (or change) in original transport speed occurring during the image reading process is apt to result in deterioration in the image reading performance of the original reading device.

In the original reading device 1 of this embodiment, the CPU 50 causes the separation roller 22 to rotate immediately before the trailing edge of the original P1 passes between the separation roller 22 and the separation plate 23. If the separation roller 22 rotates, the tensile force acting in a portion of the original P1 between the separation roller 22 and the registration rollers 26 decreases. If the circumferential speed of the separation roller 22 is made higher than the circumferential speed of the registration rollers 26 at this time, the portion of the original P1 between the separation roller 22 and the registration rollers 26 properly slacks.

As a result, the load fluctuation which would occur when the trailing edge of the original P1 passes the point between the separation roller 22 and the separation plate 23 decreases and the unevenness in original transport speed becomes less likely to occur at the original reading position.

The timing at which the trailing edge of the original P1 passes the point between the separation roller 22 and the separation plate 23 is calculated based on an elapsed time from the beginning of rotation of the registration rollers 26, the size of the original P1 and the original transport speed which is uniquely determined in the original reading device 1. In calculating this timing, the CPU 50 measures the elapsed time from the beginning of rotation of the registration rollers 26 by using the internal timer 50A. The size of the original P1 is detected by the original size sensor 55 located on the original loading tray 33. Data on the original transport speed is stored in the ROM 51.

Upon calculating the timing at which the trailing edge of the original P1 passes the point between the separation roller 22 and the separation plate 23, the CPU 50 engages the clutch 58 to rotate the separation roller 22 at a slightly advanced timing than the calculated timing. It is therefore possible to cause the separation roller 22 to begin rotating when the rear part of the original P1 close to the trailing edge thereof is located between the separation roller 22 and the separation plate 23, so that the trailing edge of the original P1 moves downstream in the original feeding direction.

Here, if the timing at which the separation roller 22 is caused to begin rotating is advanced, the original P1 will produce a larger slack (loose part). If the timing at which the separation roller 22 is caused to begin rotating is delayed, on the contrary, the original P1 will produce a smaller slack.

If the slack in the original P1 is too large, the original P1 being transported is likely to jam in the original transport path 25. If the slack in the original P1 is too small, the load fluctuation will occur when the trailing edge of the original P1 passes between the separation roller 22 and the separation plate 23.

In this embodiment, the CPU 50 controls rotation of the separation roller 22 in such a manner that the separation roller 22 begins to rotate when a position of the original P1 located 5 mm to 10 mm forward from the trailing edge thereof passes by the separation roller 22 so that the original P1 would slack by a proper amount.

In this embodiment, a mechanism for rotating the separation roller 22 and the registration rollers 26 is set to such a gear ratio that the circumferential speed of the separation roller 22 is higher than the circumferential speed of the registration rollers 26 by approximately 0.5% to 1.0%. This difference in the circumferential speed makes it easy to produce a proper slack in the original P1 between the separation roller 22 and the registration rollers 26 by rotating the separation roller 22.

In this embodiment, the CPU 50 keeps the separation roller 22 rotating since the rear part of the original P1 close to the trailing edge thereof is brought to the point between the separation roller 22 and the separation plate 23 until the trailing edge of the original P1 completely passes between the separation roller 22 and the separation plate 23. The CPU 50 controls the separation roller 22 in this way to ensure that an adequate slack would be formed in the original P1.

Figure 5:
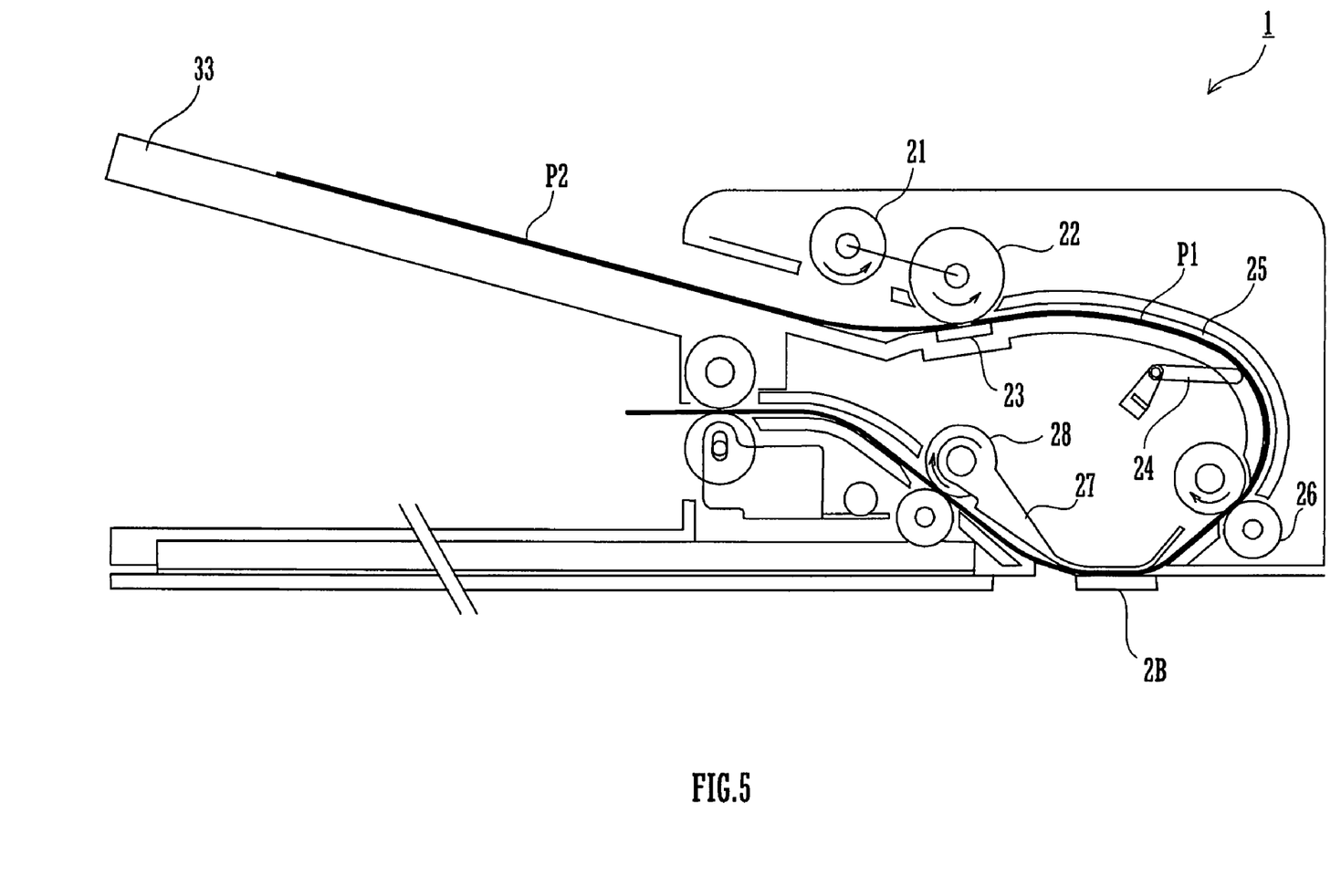
FIG. 5 is a diagram showing how multiple originals are transported one after another in the original reading device.

FIG. 5 is a diagram showing how multiple originals are transported in succession in the original reading device 1. As previously mentioned, the separation roller 22 is caused to rotate immediately before the trailing edge of the original P1 passes between the separation roller 22 and the separation plate 23 in the image reading process. At this time, the rotational driving force exerted on the separation roller 22 is transmitted to the pickup roller 21 via an unillustrated belt. Also, the rotational driving force exerted on the separation roller 22 is transmitted to an arm of the pickup roller 21 via the belt, causing the arm to swing.

This arrangement makes it possible to begin transporting an original P2 to be fed next at the timing when the separation roller 22 begins to rotate. FIG. 5 shows a situation in which a leading edge of the original P2 is brought to the point between the separation roller 22 and the separation plate 23 approximately at the same time when the trailing edge of the original P1 comes apart from the separation roller 22.

Figure 6A:
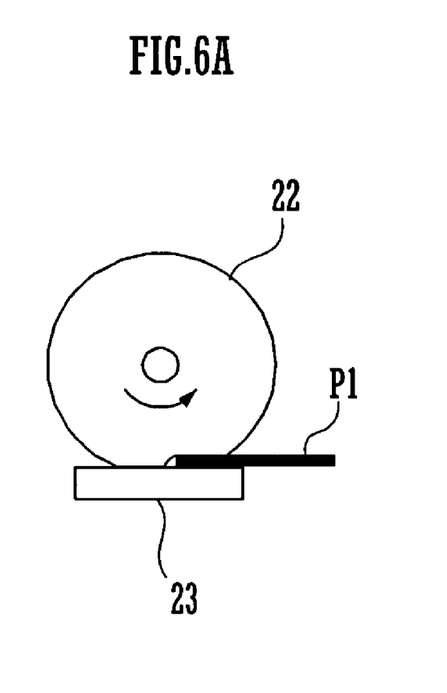
FIGS. 6A and 6B are diagrams showing a separation roller and a nearby structure thereof.
Figure 6B:
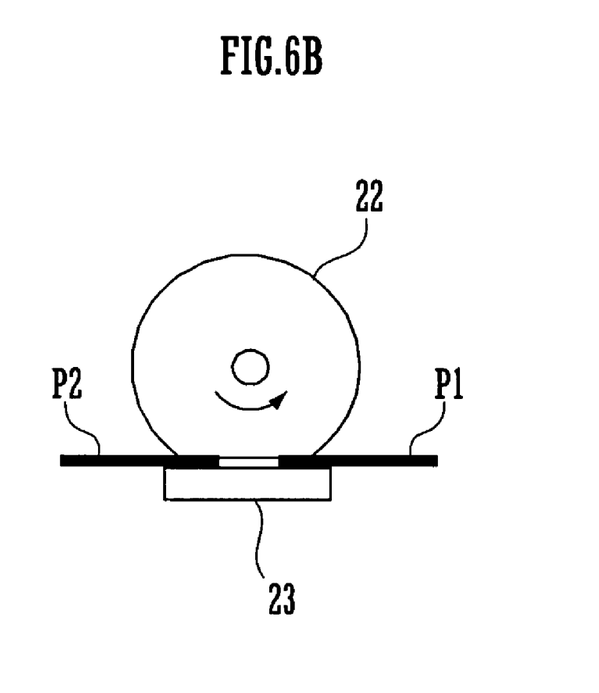

FIGS. 6A and 6B are enlarged views particularly showing the point between the separation roller 22 and the separation plate 23. Of these Figures, FIG. 6A shows an ordinary original transporting state whereas FIG. 6B shows an original transporting state in which the original reading device 1 is transporting the multiple originals in succession.

As can be seen from FIG. 6B, the original reading device 1 guides the leading edge of the original P2 to the point between the separation roller 22 and the separation plate 23 approximately at the same time when the separation roller 22 pushes the trailing edge of the original P1 downstream in the original feeding direction. As the successive originals are fed in this fashion, the distance between the two originals P1, P2 is so small that images on the multiple originals can be read at a high reading speed.

While the invention has thus far been described with reference to the preferred embodiment thereof, the aforementioned arrangements of the embodiment are simply illustrative and not limiting the invention. The scope of the invention should be determined solely by the appended claims, and not by the foregoing embodiment. It is to be understood that the invention is intended to cover the appended claims as well as all possible modifications of the embodiment and equivalents thereof which may occur to those skilled in the art within the spirit and scope of the invention.

What is claimed is:

1. An original reading device comprising:
   an original transport path formed from an original loading tray to an original output position by way of an original reading position;
   a registration roller located upstream of the original reading position along an original feeding direction for adjusting the timing of feeding an original to the original reading position;
   at least one original feed roller for transporting the original which has been fed from the original loading tray into the original transport path toward the registration roller; and
   a rotary motion controller arranged to cause said at least one original feed roller to stop after a leading edge of the original has come into contact with the registration roller and causes the original feed roller closest to the registration roller to restart rotating approximately when a rear part of the original close to a trailing edge thereof passes over the original feed roller closest to the registration roller such that the trailing edge of the original and a leading edge of a subsequent sheet contact the original feed roller closest to the registration roller at the same time.

2. The original reading device according to claim 1, wherein the rotary motion controller causes the original feed roller closest to the registration roller to rotate since the rear part of the original close to the trailing edge thereof is brought to the original feed roller closest to the registration roller until the trailing edge of the original leaves the original feed roller closest to the registration roller.

3. The original reading device according to claim 1 further comprising:
   a pickup roller for feeding each original from the original loading tray into the original transport path;
   wherein a driving force is transmitted from the original feed roller to the pickup roller, and the pickup roller feeds a next original when the rear part of the preceding original passes over the original feed roller.

4. The original reading device according to claim 1, wherein the circumferential speed of the original feed roller closest to the registration roller is higher than the circumferential speed of the registration roller.

5. The original reading device according to claim 1 further comprising:
   an original size sensor for detecting the size of the original loaded on the original loading tray; and
   a timer for measuring time elapsed since the registration roller has begun to rotate;
   wherein the rotary motion controller determines the timing of rotating the original feed roller closest to the registration roller based on the elapsed time measured by the timer, the length of the original along the original feeding direction, and original transport speed of the original reading device.

6. The original reading device according to claim 5, wherein:
   based on the elapsed time measured by the timer, the length of the original along the original feeding direction, and the original transport speed of the original reading device, the rotary motion controller causes the original feed roller closest to the registration roller to start rotating when a position of an original located 5 mm to 10 mm forward from a trailing edge thereof passes the original feed roller closest to the registration roller, and
   the original feed roller closest to the registration roller is configured in such a manner that a circumferential speed thereof is higher than a circumferential speed of the registration roller by approximately 0.5% to 1.0%.

* * * * *